United States Patent [19]
Pederson et al.

[11] Patent Number: 5,864,842
[45] Date of Patent: Jan. 26, 1999

[54] OPTIMIZATION OF SQL QUERIES USING HASH STAR JOIN OPERATIONS

[75] Inventors: Donald Raymond Pederson, La Palma; Olli Pekka Kostamaa, Santa Monica, both of Calif.

[73] Assignee: NCR Corporation, Dayton, Ohio

[21] Appl. No.: 546,858

[22] Filed: Oct. 23, 1995

[51] Int. Cl.$^6$ ................................................. G06F 17/30
[52] U.S. Cl. ................................................. 707/3; 707/2
[58] Field of Search .................................. 395/601, 602, 395/603, 604, 605, 606, 607, 608, 609, 610, 611, 616, 673

[56] References Cited

U.S. PATENT DOCUMENTS

| | | | |
|---|---|---|---|
| 5,379,419 | 1/1995 | Heffernan et al. | 395/604 |
| 5,437,032 | 7/1995 | Wolf et al. | 395/673 |
| 5,495,606 | 2/1996 | Borden et al. | 395/603 |
| 5,530,939 | 6/1996 | Mansfield et al. | 395/617 |
| 5,590,319 | 12/1996 | Cohen et al. | 395/604 |

OTHER PUBLICATIONS

DeWitt, et. al., "The Gamma Database Machine Project", *IIEE Transactions on Knowledge and Data Engineering*, vol. 2, No. 1, pp. 44–62, Mar. 1990.

Neches, P.M., "The YNET: An Interconnect structure for a Highly Concurrent Data Base Computer System", Teradata Corporation, ®1988 by Teradata Corporation.

*Primary Examiner*—Thomas G. Black
*Assistant Examiner*—Rauy Lian Ho
*Attorney, Agent, or Firm*—Gates & Cooper

[57] ABSTRACT

A method, apparatus, and article of manufacture for optimizing SQL queries in a relational database management system uses hash star join operations. A hash star join operation is performed in place of the star join operation when the query includes the star join operation on a base table and the plurality of dimension tables. The base table is hash partitioned into a plurality of distinct and separate sub-portions thereof. Selecting and projecting rows from all of the dimension tables to separate temporary dimension tables. The query is split into a plurality of sub-queries, wherein each of the sub-queries comprises a hash star join operation on the temporary dimension tables and one or more of the distinct sub-portions of the base table. Each of the sub-queries are then performed independently of one another to create intermediate result tables. The intermediate result tables from each of the sub-queries are then merged together to create an output table.

21 Claims, 7 Drawing Sheets

OPTIMIZATION OF SQL QUERIES USING HASH STAR JOIN OPERATIONS

BACKGROUND OF THE INVENTION

1. Field of the Invention

This invention relates in general to databases management systems performed by computers, and in particular, to the optimization of SQL queries in a relational database management system using hash star join operations.

2. Description of Related Art

Relational DataBase Management Systems (RDBMS) using a Structured Query Language (SQL) interface are well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator performs functions on one or more tables and produces a new table as a result. The power of SQL lies on its ability to link information from multiple tables or views together to perform complex sets of procedures with a single statement.

A table in a relational database system is two dimensional, consisting of rows and columns. Each column has a name, typically describing the type of data held in that column. As new data is added, more rows are inserted into the table. A user query selects some rows of the table by specifying clauses that qualify the rows to be retrieved based on the values in one or more of the columns.

One of the most important operations in the execution of SQL queries is the join of two or more tables. A user can specify selection criteria from more than one table by specifying how to join the tables. This is normally done by a conditional operator on the columns of the tables.

However, join operations can be quite costly in terms of performance. In joins that involve two tables, each row of the first table might be joined to many rows of the second table. Joins that involve more than two tables are usually resolved by joining two tables at a time. In this case, the order that the tables are joined is extremely important.

Although techniques have been developed for optimizing SQL query expressions involving joins, there is still a need in the art for additional optimization techniques for join operations.

SUMMARY OF THE INVENTION

To overcome the limitations in the prior art described above, and to overcome other limitations that will become apparent upon reading and understanding the present specification, the present invention discloses a method, apparatus, and article of manufacture for optimizing SQL queries in a relational database management system using hash star join operations. The hash star join operations are performed in place of a sequence of binary join operations (joining two tables at a time) when the query includes a star join operation on a base table and a plurality of dimension tables. The base table is hash partitioned into a plurality of distinct and separate sub-portions thereof. The hash partitioning key comprises the join columns from the base table that are expressed in the star query as connections to the dimension tables. In the preferred embodiment, the distinct sub-portions of the base table are spread across a plurality of processors and stored on a plurality of data storage devices attached to the processors. Rows from all of the dimension tables are selected and projected according to the other selection criteria (if any) in the query and are duplicated on all processors, each in their own temporary table. The query is split into a plurality of sub-queries, wherein each of the sub-queries comprises a join operation on the rows of the temporary tables derived from the dimension tables and the hash partitioned base table. This join operation is a multi-table join step, which reads a row from each of the temporary tables, and hashes all the combinations of the dimension table connection clauses, so that a hash probe can be made to possibly find a matching row in the base table. Each of the sub-queries are then performed independently of one another to create intermediate result tables. In the preferred embodiment, where the computer system comprises a plurality of processors, the sub-queries are performed independently on different ones of the processors. The intermediate result tables from each of the sub-queries are then merged together to create an output table.

An object of the present invention is to optimize star joins in SQL queries that involve multiple tables. Another object of the present invention is to optimize SQL queries that are executed by massively parallel processor (MPP) computer systems. Yet another object of the present invention is to improve the performance of star joins performed by massively parallel processor (MPP) computer systems.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

ENVIRONMENT

Figure 1:
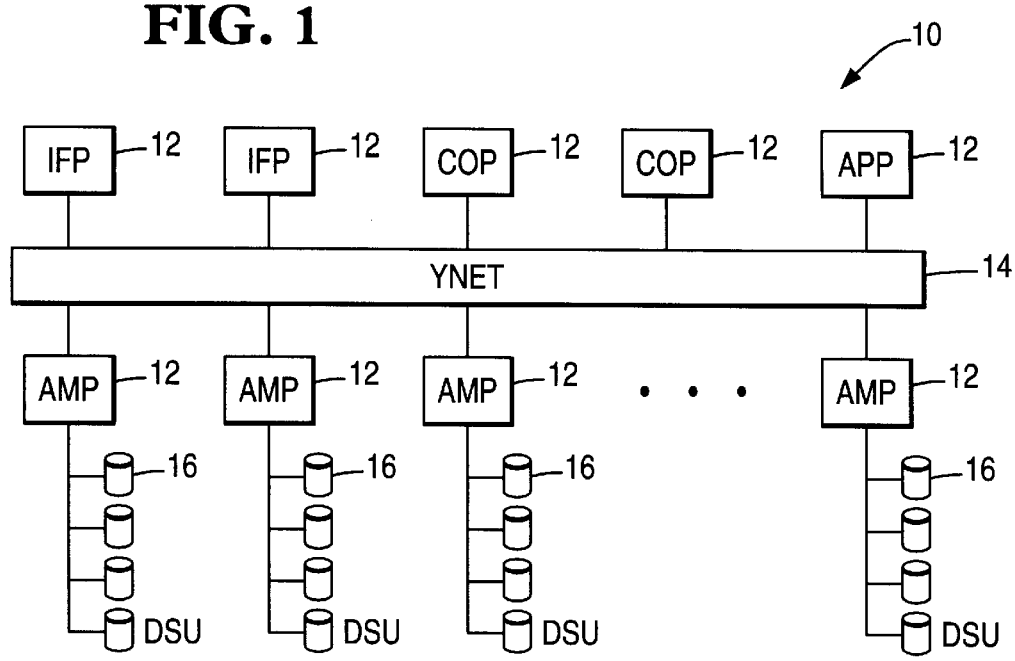
FIG. 1 illustrates an exemplary computer hardware environment that could be used with the present invention.

FIG. 1 illustrates an exemplary computer hardware environment that could be used with the present invention. In the exemplary computer hardware environment, a computer system 10 is comprised of one or more processors 12 interconnected by a network 14 and coupled to one or more fixed and/or removable data storage units (DSUs) 16, such as disk drives, that store one or more relational databases. The present invention is embodied in a computer program executed or performed by the computer system 10. The computer program itself may be stored, for example, in the memory of the processors 12 and/or on one of the DSUs 16.

In the exemplary computer hardware environment of FIG. 1, a massively parallel processor (MPP) computer system 10 is illustrated. Each of the processors or nodes 12 are typically comprised of uni-processor or symmetric multi-processor (SMP) architectures. The system 10 includes interface processor (IFP) nodes 12, application processing processor (APP) nodes 12, communications processor (COP) nodes 12, and access module processor (AMP) nodes 12, all of which are connected by an interconnect network 14 (also known as a YNET). The IFP nodes 12 provide the connection to client systems on channel connected mainframes. The COP nodes 12 provide connection to client systems on workstations or networks through a communications interface. The AMP nodes 12 manage one or more attached DSUs 16.

Operators of the computer system 10 use a terminal or workstation to transmit electrical signals to and from the computer system 10 that represent commands for performing various search and retrieval functions, termed queries, against the databases. In the preferred embodiment, these queries conform to the Structured Query Language (SQL) standard, and invoke functions performed by Relational DataBase Management System (RDBMS) software executed by the system 10. Those skilled in the art will recognize, however, that the present invention has application to any database software that performs joins of tables. Moreover, in the preferred embodiment of the present invention, the RDBMS software comprises the Teradata® product offered by AT&T Global Information Solutions™. The RDBMS software performs the functions necessary to implement the RDBMS and SQL standards, i.e., definition, compilation, interpretation, optimization, database access control, database retrieval, and database update.

Work is divided among the processors 12 in the system 10 by spreading the storage of the rows of each table across all of the AMP nodes 12. Thus, each AMP node 12 stores some of the rows of each table and work is managed by the system 10 so that the task of operating on the rows is performed by the AMP node 12 managing the DSUs 16 that store the specific rows.

Software executed by the IFP/COP nodes 12 fully parallelizes all functions among the AMP nodes 12. As a result, the system of FIG. 1 applies a multiple instruction stream, multiple data stream (MIMD) concurrent processing architecture to implement a relational database management system 10.

The system 10 does face the issue of how to divide a SQL query into smaller sub-queries, each of which can be assigned to an AMP node 12. In the preferred embodiment, a hashing algorithm assigns data rows to AMP nodes 12. The columns or fields comprising the primary index of the rows are typically put through a modulo prime number hashing algorithm, which results in a hash "bucket" number. A hash map provides the mapping of hash buckets to AMP nodes 12.

There are generally a large number of hash bucket numbers, and each AMP node 12 may be assigned several bucket numbers for both prime and fallback hash maps. This makes it possible to evenly divide the storage data, and hence the processing load, among the AMP nodes 12 in the system 10.

When additional AMP nodes 12 are configured into a system 10, the new AMP nodes 12 are populated by re-mapping some hash buckets from the existing AMP nodes 12 to the new AMP nodes 12, and then moving the rows corresponding to the re-mapped hash buckets to the DSUs 16 managed by the new AMP nodes 12. Thus, only the minimum amount of data necessary is moved during a reconfiguration of the system 10.

EXECUTION OF SQL QUERIES

Figure 2:
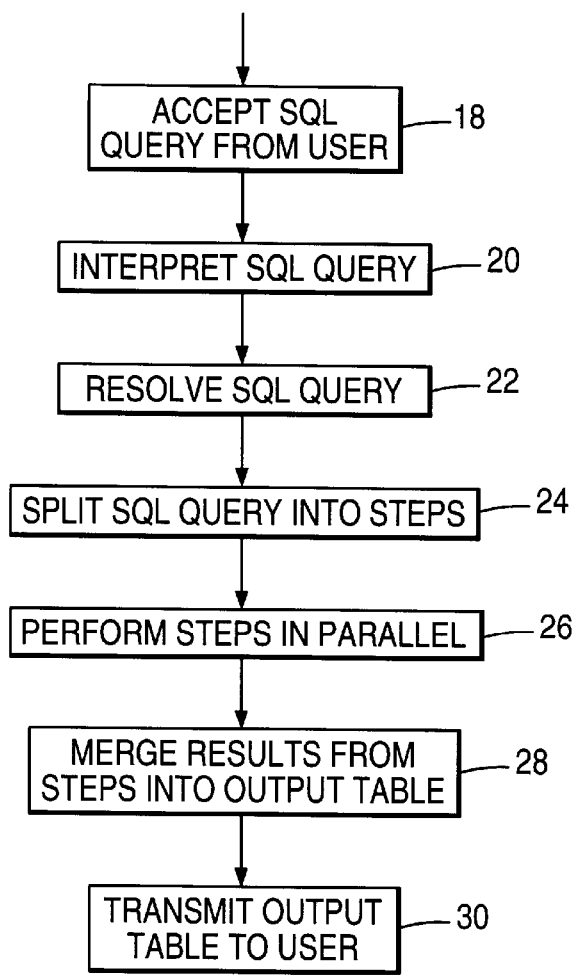
FIG. 2 is a flow chart illustrating the steps necessary for the interpretation and execution of SQL statements, either in source code or in an interactive environment, according to the present invention.

FIG. 2 is a flow chart illustrating the steps necessary for the interpretation and execution of SQL statements, either in a batch environment or in an interactive environment, according to the present invention. Although the preferred embodiment of the present invention uses SQL, those skilled in the art will recognize that the invention disclosed herein may also apply to any RDBMS that performs join operations on tables. The use of SQL in the preferred embodiment of the present invention is not intended to be limiting in any manner.

Block 18 represents an SQL query being accepted by the IFP node 12. Block 20 represents the SQL query being transformed by an SQL interpreter executing on the IFP node 12. Block 22 represents the SQL interpreter resolving symbolic names in the query using a data dictionary that contains information about all the databases and tables in the system. Block 24 represents the SQL interpreter splitting the query into one or more "step messages", wherein each step message is assigned to an AMP node 12 identified by a hash bucket.

As mentioned above, the rows of the tables are evenly distributed among all AMP nodes 12, so that all AMP nodes 12 can work at the same time on the data of a given table. If a request is for data in a single row, i.e., a prime index request, the IFP node 12 transmits it to the AMP node 12 in which the data resides. If the request is for multiple rows, then the steps are forwarded to all participating AMP nodes 12. Since the database tables are evenly distributed across the DSUs 16 of the AMP nodes 12, the workload of performing the SQL query is balanced between the AMP nodes 12 and DSUs 16.

Block 24 also represents a dispatcher task executed by the IFP node 12 sending the step messages to their assigned AMP nodes 12 via the interconnect network 14. Block 26 represents the AMP nodes 12 performing the required data manipulation associated with the step messages received from the IFP node 12, and then transmitting appropriate responses back over the interconnect network 14 to the IFP node 12. Block 28 represents the IFP node 12 then merging the responses that come from the AMP nodes 12. Block 30 represents the output or result table being transmitted from the IFP node 12 to the users.

SELECT STATEMENT

One of the most common SQL queries executed by the RDBMS software is the SELECT statement. In the SQL standard, the SELECT statement generally comprises the format: "SELECT <clause> FROM <clause> WHERE <clause> GROUP BY <clause> HAVING <clause> ORDER BY <clause>." The clauses generally must follow this sequence, but only the SELECT and FROM clauses are required. The result of a SELECT statement is a subset of data retrieved by the RDBMS software from one or more existing tables stored in the relational database, wherein the FROM clause identifies the name of the table or tables from which data is being selected. The subset of data is treated as a new table, termed the result table, which typically comprises a temporary table. In general, the items specified in the SELECT clause of the SELECT statement determine the columns that will be returned in the result table from the table(s) identified in the FROM clause.

The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause. The search condition typically comprises one or more predicates, each of which specify a comparison between two values comprising columns, constants or correlated values. Multiple predicates in the WHERE clause are themselves typically connected by Boolean operators.

JOIN OPERATION

A join operation is usually implied by naming more than one table in the FROM clause of a SELECT statement. A join operation makes it possible to combine tables by combining rows from one table to another table. The rows, or portions of rows, from the different tables are concatenated horizontally. Although not required, join operations normally include a WHERE clause that identifies the columns through which the rows can be combined. The WHERE clause may also include a predicate comprising one or more conditional operators that are used to select the rows to be joined.

To produce the final, desired result of the query, most database systems only consider a binary join order (joining two tables at a time) of the tables. This binary join order is chosen by an optimization function performed by the SQL interpreter. Each of the two tables in each step of the binary join order can be joined using one of several methods. The most popular methods are nested loop join, sort merge join, and hash join. It is also the job of the SQL interpreter to decide which method will perform best. For each step in the join binary order, the particular method can differ.

Figure 3:
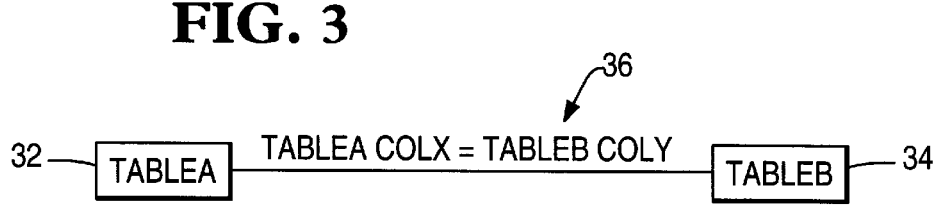
FIG. 3 is a query graph that represents a join operation, wherein a box represents a table, and the connection between the boxes represents the join clause.

FIG. 3 is a query graph that represents a join operation, wherein the boxes 32 and 34 represent tables, and the connection 36 between the boxes 32 and 34 represents the join clause. In the figure, Table A (32) and Table B (34) are joined on an equality of Column X from Table A and Column Y in Table B (36).

STAR JOIN OPERATION

Figure 4:
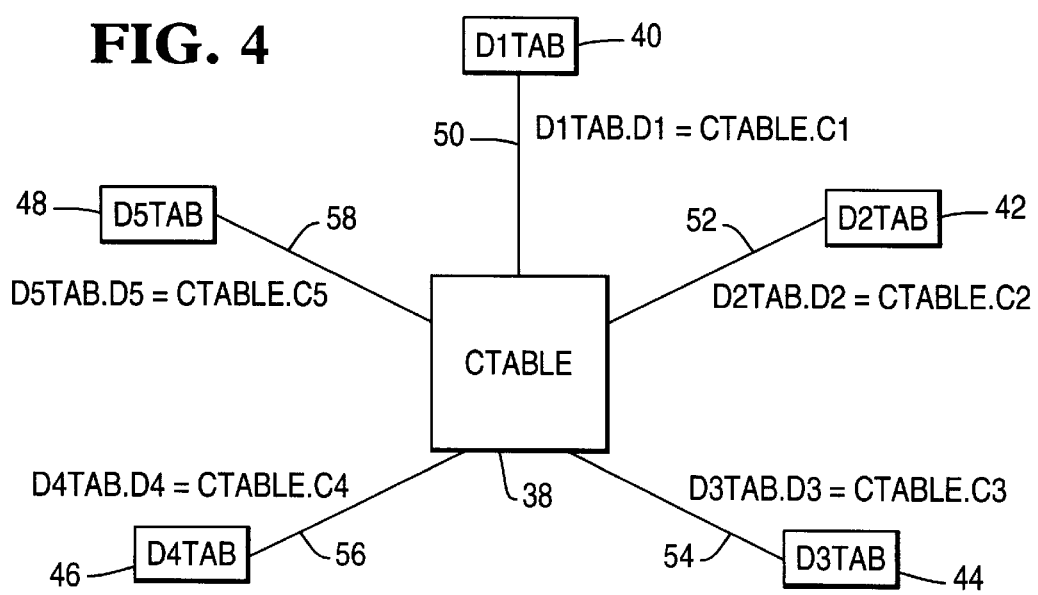
FIG. 4 is a query graph that represents a star join operation, wherein the boxes represent tables, and the connections between the boxes represents the star joins.

FIG. 4 is a query graph that represents a star join operation, wherein the boxes 38, 40, 42, 44, 46 and 48 represent tables, and the connections 50, 52, 54, 56 and 58 between the boxes 38, 40, 42, 44, 46 and 48 represent the star joins. The base table at the center of the query graph, CTABLE 38, is joined to two or more dimension tables f(DiTAB where i=1 to 5) according to specified relational or conditional operations. In this example, the dimension tables D1TAB 40, D2TAB 42, D3TAB 44, D4TAB 46, and D5TAB 48 are joined to the base table CTABLE 38 with an equivalence condition. In this example of a star join operation, there are no join conditions between the dimension tables 40, 42, 44, 46, 48, themselves.

An exemplary SQL query for performing the star join operation shown in FIG. 4 would be the following:

SELECT <list of columns>
FROM CTABLE, D1TAB, D2TAB, D3TAB, D4TAB, D5TAB WHERE

CTABLE.C1=D1TAB.D1 AND

CTABLE.C2=D2TAB.D2 AND

CTABLE.C3=D3TAB.D3 AND

CTABLE.C4=D4TAB.D4 AND

CTABLE.C5=D5TAB.D5 AND

<other selection criteria but no more joins>

A typical join plan is to choose a sequence of binary joins between the tables. It is the job of an optimizer function in the SQL interpreter to pick the least costly binary join order.

HASH STAR JOIN OPERATION

A Hash Star Join is a new multi-table join method that can be used to optimize star joins. The Hash Star Join extends the simple hash join from two table joins to multi-table joins. A description of the hash join can be found in D. J. DeWitt et al., "The Gamma Database Machine Project", *IEEE Trans. on Knowledge and Data Engineering*, Vol. 2, No. 1, March 1990, pp. 44–62 (hereinafter referred to as "DGSB90"), incorporated by reference herein.

The hash star join operations are performed in place of a sequence of binary join operations (joining two tables at a time) when the query includes a star join operation on a base table and a plurality of dimension tables. The base table is hash partitioned into a plurality of distinct and separate sub-portions thereof. The hash partitioning key comprises the join columns from the base table that are expressed in the star query as connections to the dimension tables. In the preferred embodiment, the distinct sub-portions of the base table are spread across the AMP nodes 12 and stored on the DSUs 16 attached to the AMP nodes 12. Rows from all of the dimension tables are selected and projected according to the other selection criteria (if any) in the query and are duplicated on all AMP nodes 12, each in their own temporary table. The query is split into a plurality of sub-queries, wherein each of the sub-queries comprises a join operation on the rows of the temporary tables derived from the dimension tables and the hash partitioned base table. This join operation is a multi-table join step, which reads a row from each of the temporary tables, and hashes all the combinations of the dimension table connection clauses, so that a hash probe can be made to possibly find a matching row in the base table. Each of the sub-queries are then performed independently of one another to create intermediate result tables. In the preferred embodiment, where the computer system 10 comprises a plurality of processors 12, the sub-queries are performed independently on different ones of the AMP nodes 12. The intermediate result tables from each of the sub-queries are then merged together to create an output table.

SIMPLE HASH STAR JOIN OPERATION

Figure 5A:
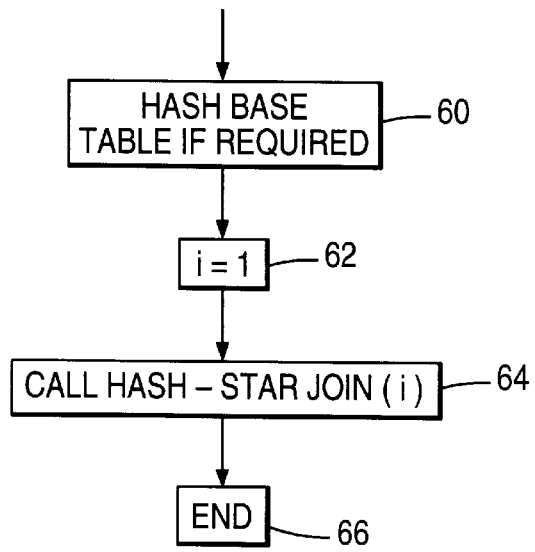
FIGS. 5A–5C together are a flow chart illustrating the logic of the general Hash Star Join for "n" dimension tables.
Figure 5B:
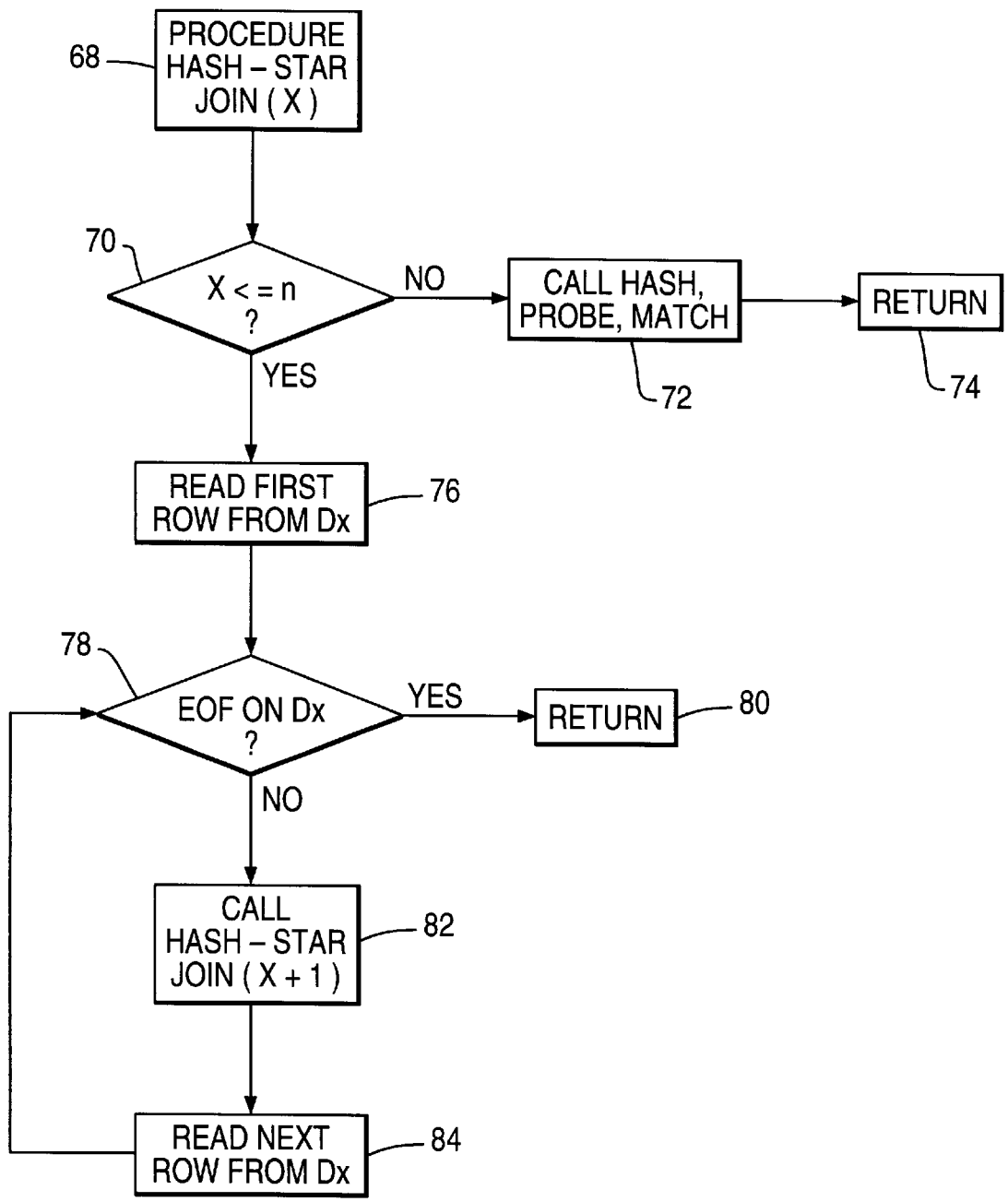
Figure 5C:
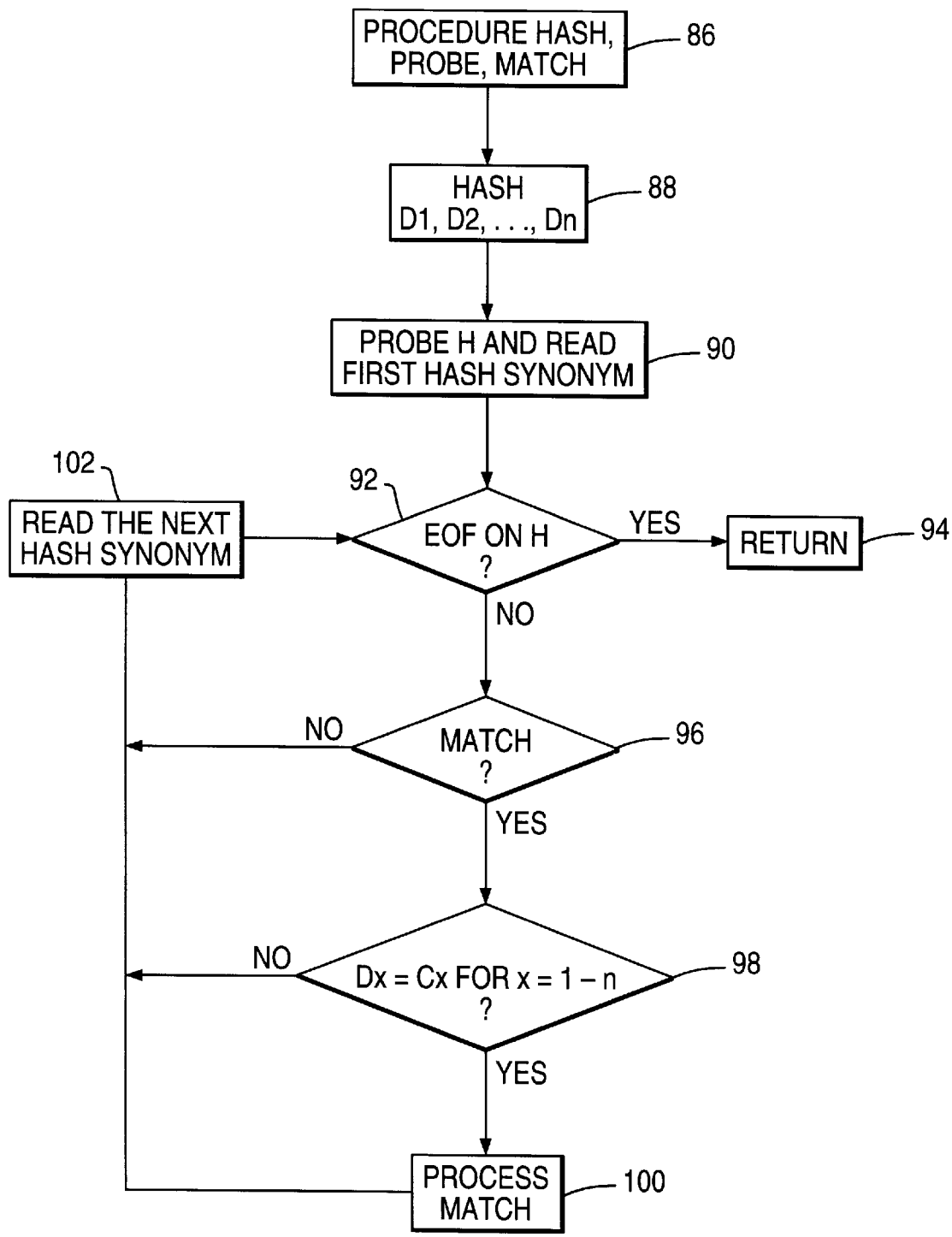

FIGS. 5A–5C together are a flow chart illustrating the logic of the general Hash Star Join for "n" dimension tables.

FIG. 5A is a flow chart illustrating the logic for the controlling steps of the main procedure. Block 60 represents the hash partition selection and projection of the base table CTABLE on columns C1, C2, . . . , Cn into a hash table H. Block 62 represents setting a counter i to an initial value of 1. Block 64 represents a call to the recursive Hash Star Join procedure and passing the value of i as a parameter, e.g., to process rows from dimension table D1TAB. Block 66 represents the termination of the Hash Star Join method.

FIG. 5B is a flow chart illustrating the logic for the steps of the recursive Hash Star Join procedure. Block 68 represents the entry into the Hash Star Join procedure, including the passing of a parameter x identifying the dimension table to be processed, i.e., DXTAB. Block 70 is a decision block that determines whether the parameter x is less than or equal to n, i.e., the highest numbered dimension table. If not, control transfers to block 72, which represents the call of the Hash, Probe, Match procedure, and then to block 74, which returns from the Hash Star Join procedure, thereby terminating the recursion. If the parameter x is less than or equal to n, then control transfers to block 76. Block 76 represents the reading of the first qualifying row from the dimension table DxTAB. Block 78 is a decision block that determines whether an end-of-file (EOF) has occurred on the attempt to read a row from the dimension table DxTAB. If so, then control transfers to block 80, which returns from the Hash Star Join procedure, thereby terminating the recursion. If the first qualifying row is read from the dimension table DxTAB without an EOF occurring, then control transfers to block 82. Block 82 represents the recursive call of the Hash Star Join procedure passing the value of x+1 as a parameter, e.g., to process rows from the next higher numbered dimension table, i.e., D(x+1)TAB. Upon a return from the recursive call of the Hash Star Join procedure, block 84 represents the reading of the next qualifying row from the dimension table DxTAB. Thereafter, control transfers to block 78, as described above.

FIG. 5C is a flow chart illustrating the logic for the steps of the Probe, Hash, Match procedure. Block 86 represents the entry into the Probe, Hash, Match procedure. Block 88 represents the hashing of the combination of columns D1, D2, . . . , Dn from their respective dimension tables D1TAB, D2TAB, . . . , DnTAB. Block 90 represents a probe of the hash table H using the combination of columns D1, D2, . . . , Dn, followed by the reading of the first hash synonym. The probe is performed only once, and looping is done by blocks 92–102 following a hash synonym chain to read the next hash synonyms. Block 92 is a decision block that determines whether an end-of-file (EOF) occurred during the reading of the hash table H. If so, control transfers to block 94, which returns from the Probe, Hash, Match procedure. If not, control transfers to block 96, which is a decision block that determines whether a match was found in the read of the hash table H. If not, control transfers to block 102; otherwise, control transfers to block 98. Block 98 is a decision block that determines whether the combination of columns, D1, D2, . . . , Dn, from the dimension tables satisfies their respective predicates with the columns, C1, C2, . . . , Cn, of the base table, such as (D1=C1 AND D2=C2 AND . . . Dn=Cn) or some other sequence of conditional or relational operations as specified in the SQL query. If so, then control is transferred to block 100, which processes the match; otherwise, control transfers to block 102. Block 102 reads the next hash synonym and control then transfers to block 92 to complete the loop.

The logic of FIGS. 5A–5C reflects the simple hash join method. The actual join can also be done using the hybrid hash join method also described in more detail in DGSB90. The key idea of Hash Star Join is not which hash join is performed, but that multiple tables are joined in a single step.

PARALLEL HASH STAR JOIN OPERATION

Figure 6A:
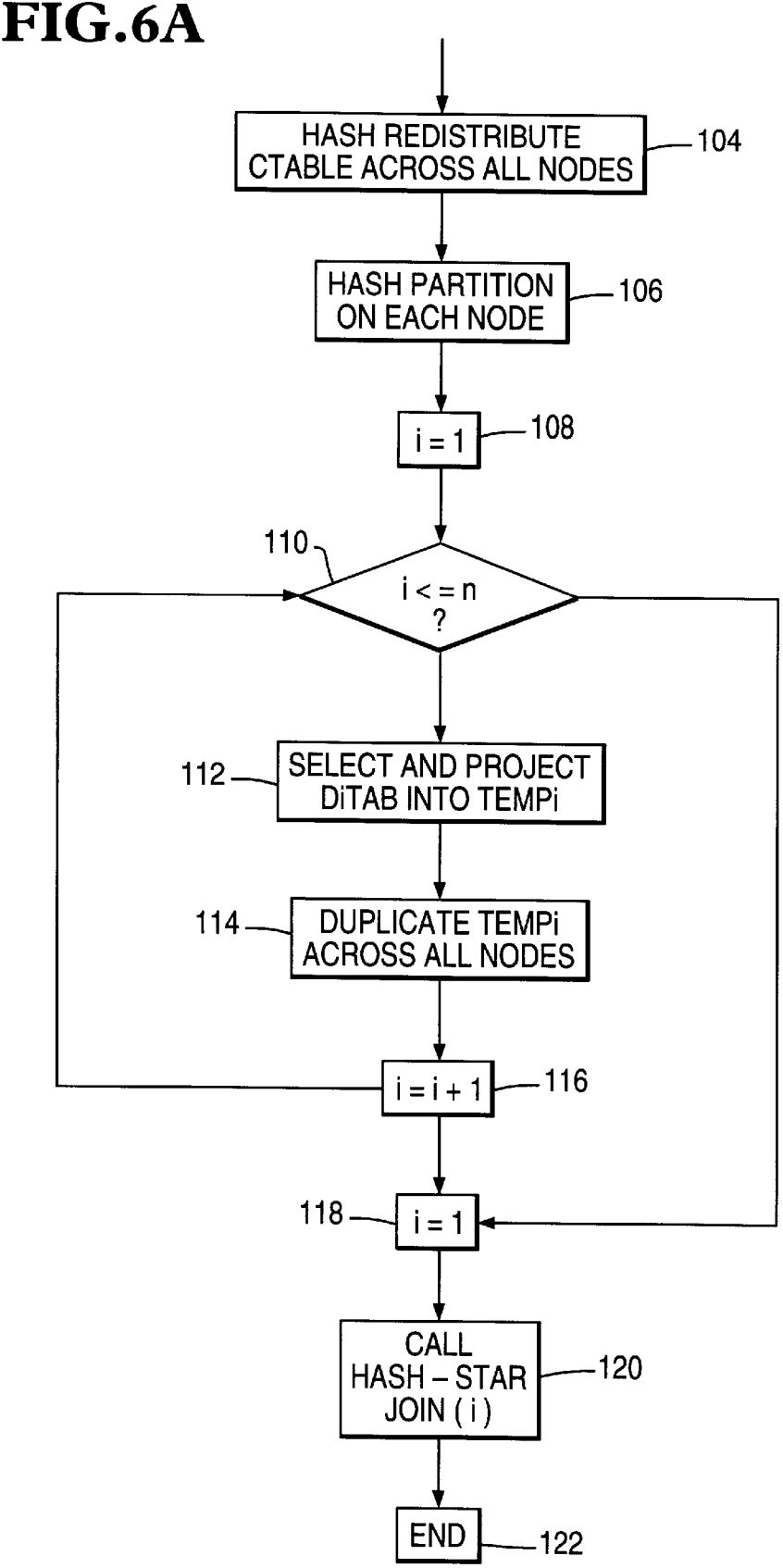
FIGS. 6A–6C together are a flow chart illustrating the logic of the Parallel Hash Star Join for "n" dimension tables.
Figure 6B:
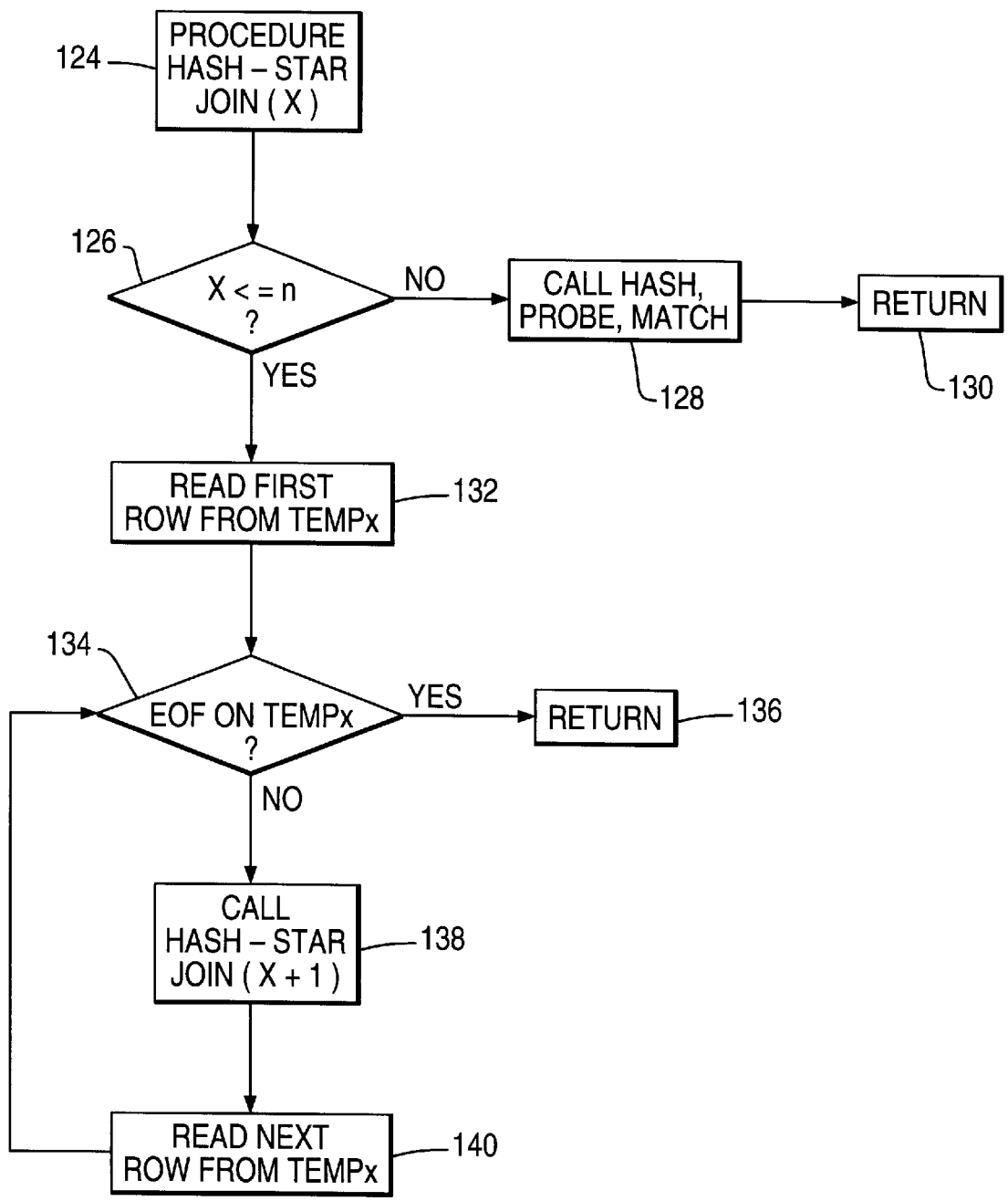
Figure 6C:
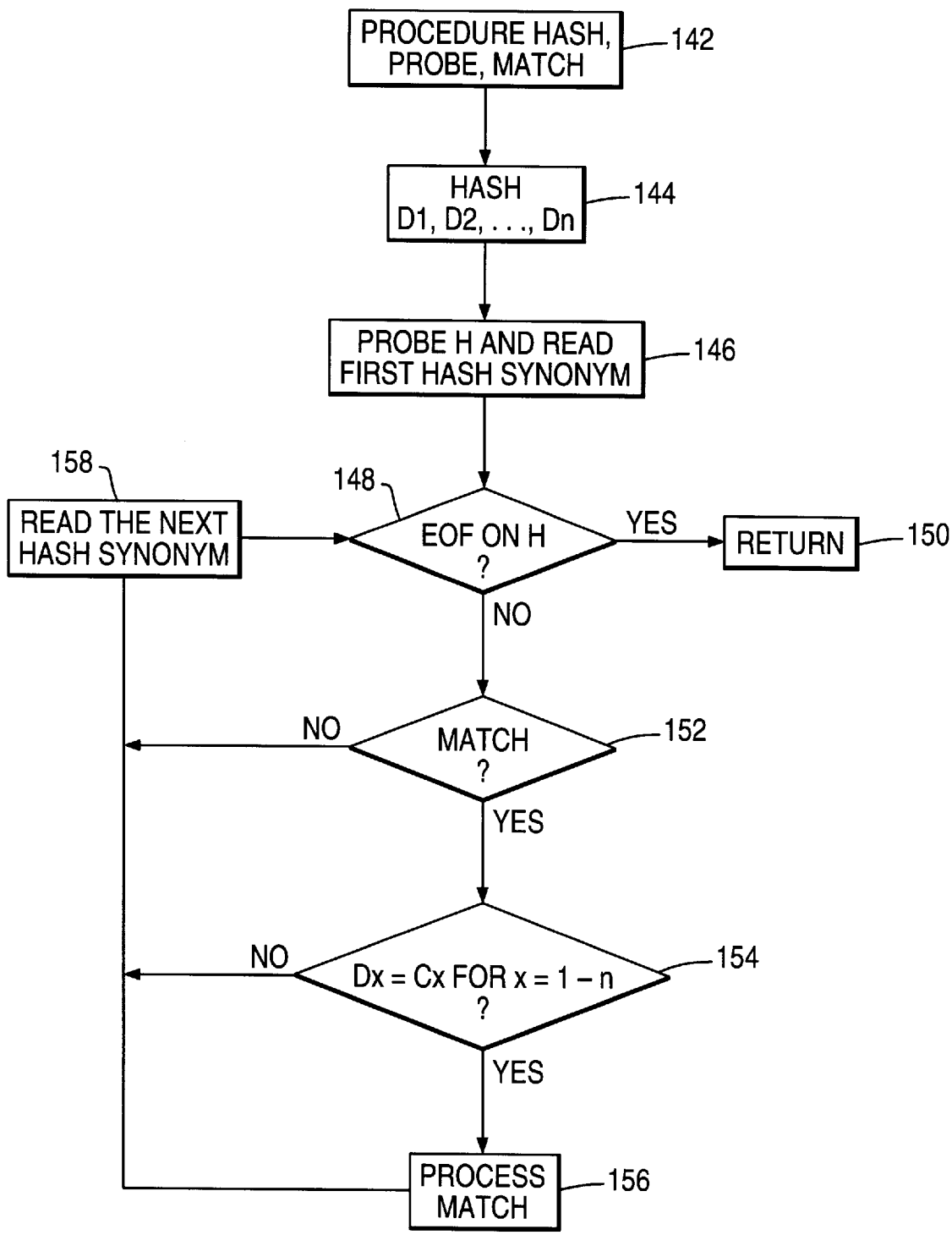

FIGS. 6A–6C together are a flow chart illustrating the logic of the Parallel Hash Star Join for "n" dimension tables. The Hash Star Join operation is particularly useful with relational databases on massively parallel processing (MPP) computer systems. In this case, the relational database is assumed to be partitioned across some number of loosely coupled nodes, wherein each of the nodes handles a portion of the database. The Parallel Hash Star Join comprises the following steps.

FIG. 6A is a flow chart illustrating the logic for the controlling steps of the main procedure. Block 104 represents the hash redistribution on the base table CTABLE on columns C1, C2, . . . , CN across all the AMP nodes 12, although this step may be skipped if the base table CTABLE is already correctly hash distributed. Block 106 represents the hash partition selection and projection of the base table CTABLE on columns C1, C2, . . . , Cn into a hash table H. Block 108 represents setting a counter i to an initial value of 1. Block 110 is a decision block that determines whether i is less than or equal to n, wherein n represents the number of dimension tables in the hash star join operation. If so, then control transfers to block 112. Block 112 represents the selection and projection of qualifying rows from the dimension table DiTAB into the temporary dimension table TEMPi. Block 114 represents the duplication of TEMPi across all AMP nodes 12 in the system 10. Block 116 represents the counter i being incremented, and then control transfers back to block 110. Once i is greater than n, then control transfers to block 118. Block 118 represents setting a counter i to an initial value of 1. Block 120 represents a call to the recursive Hash Star Join procedure and passing the value of i as a parameter, e.g., to process rows from the dimension table D1TAB. Block 122 represents the termination of the Hash Star Join method.

FIG. 5B is a flow chart illustrating the logic for the steps of the recursive Hash Star Join procedure. Block 124 represents the entry into the Hash Star Join procedure, including the passing of a parameter x identifying the temporary dimension table to be processed, i.e., TEMPx. Block 126 is a decision block that determines whether the parameter x is less than or equal to n, i.e., less than or equal to the highest numbered dimension table. If not, control transfers to block 128, which represents the call of the Hash, Probe, Match procedure, and then to block 130, which returns from the Hash Star Join procedure, thereby terminating the recursion. If the parameter x is less than or equal to n, then control transfers to block 132. Block 132 represents the reading of the first qualifying row from the temporary dimension table TEMPx. Block 134 is a decision block that determines whether an end-of-file (EOF) has occurred on the attempt to read a row from the temporary dimension table TEMPx. If so, then control transfers to block 136, which returns from the Hash Star Join procedure, thereby terminating the recursion. If the first qualifying row is read from the temporary dimension table TEMPx without an EOF occurring, then control transfers to block 138. Block 138 represents the recursive call of the procedure Hash Star Join procedure passing the value of x+1 as a parameter, e.g., to process rows from the next higher numbered temporary dimension table, i.e., TEMP(x+1). Upon a return from the recursive call of the Hash Star Join procedure, block 140 represents the reading of the next qualifying row from the temporary dimension table TEMPx. Thereafter, control transfers to block 134, as described above.

FIG. 6C is a flow chart illustrating the logic for the steps of the Probe, Hash, Match procedure. Block 142 represents the entry into the Probe, Hash, Match procedure. Block 144 represents the hashing of the combination of columns D1, D2, . . . , Dn from their respective temporary dimension tables TEMP1, TEMP2, . . . , TEMPn. Block 146 represents a probe of the hash table H using the combination of columns D1, D2, . . . , Dn, followed by the reading of the first hash synonym. The probe is performed only once, and looping is done by blocks 148–158 following a hash synonym chain to read the next hash synonyms. Block 148 is a decision block that determines whether an end-of-file (EOF) occurred during the reading of the hash table H. If so, control transfers to block 150, which returns from the Probe, Hash, Match procedure. If not, control transfers to block 152, which is a decision block that determines whether a match was found in the read of the hash table H. If not, control transfers to block 158; otherwise, control transfers to block 154. Block 154 is a decision block that determines whether the combination of columns, D1, D2, . . . , Dn, from the dimension tables satisfies their respective predicates with the columns, C1, C2, . . . , Cn, of the base table, such as (D1=C1 AND D2=C2 AND . . . Dn=Cn) or some other sequence of conditional and relational operations specified in the SQL query. If so, then control is transferred to block 156, which processes the match; otherwise, control transfers to block 158. Block 158 reads the next hash synonym and control then transfers to block 148 to complete the loop.

CONCLUSION

This concludes the description of the preferred embodiment of the invention. The following paragraphs describe some alternative embodiments for accomplishing the same invention.

In one alternative embodiment, any type of computer, such as a mainframe, minicomputer, or personal computer, could be used to implement the present invention. In addition, any RDBMS that joins tables (e.g. SQL-based or other RDBMS) could benefit from the present invention.

In another alternative embodiment, the partitions of the base table need not be spread across separate data storage devices. Instead, the partitions could be stored on one or a few data storage devices simply to minimize the amount of temporary data storage required at each of the step of performing the SQL query.

In yet another alternative embodiment, the sub-queries could be performed by one or a few processors, rather than separate processors for each of the sub-queries. The present invention could split the query into sub-queries that are then performed sequentially by a single processor in order to minimize the overhead associated with the processing of the entire query. In addition, the sub-queries could be performed simultaneously on a single processor using a multi-tasking operating environment.

In summary, the present invention discloses a method, apparatus, and article of manufacture for optimizing SQL queries in a relational database management system uses hash star join operations. A hash star join operation is performed in place of a sequence of binary join operations when the query includes the star join operation on a base table and the plurality of dimension tables. The base table is hash partitioned into a plurality of distinct and separate sub-portions thereof. Selected and projected rows from all of the dimension tables are read into separate temporary tables. The query is split into a plurality of sub-queries, wherein each of the sub-queries comprises a join operation on all the temporary tables and one or more of the distinct sub-portions of the base table. Each of the sub-queries are then performed independently of one another to create intermediate result tables. The intermediate result tables from each of the sub-queries are then merged together to create an output table.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a computer having a memory, the query being performed by the computer to retrieve data from a relational database stored in one or more electronic storage devices coupled to the computer, the method comprising the steps of:

(a) examining the query in the memory of the computer to determine whether the query includes a star join operation on a base table and a plurality of dimension tables; and (b) performing, in the memory of the computer, a hash star join operation when the query includes the star join operation on the base table and the plurality of dimension tables, further comprising the steps of:

(1) hash partitioning the base table into a plurality of distinct and separate sub-portions thereof;

(2) selecting and projecting rows from all of the dimension tables to separate temporary tables;

(3) splitting the query into a plurality of sub-queries, wherein each of the sub-queries comprises a hash star join operation on the separate temporary tables and one or more of the distinct sub-portions of the base table;

(4) performing each of the sub-queries independently of one another to create intermediate result tables; and (5) merging the intermediate result tables from each of the performed sub-queries to create an output table.

2. The method of claim 1 above, wherein the computer system comprises a plurality of processors, and the step of performing the sub-queries independently of one another further comprises the step of performing the sub-queries independently on different ones of the processors.

3. The method of claim 2 above, further comprising the step of storing each of the distinct sub-portions of the base table by a different one of the processors.

4. The method of claim 2 above, further comprising the step of duplicating the separate temporary tables across all of the processors.

5. An apparatus for optimizing a query, comprising:

(a) a computer having a memory and one or more electronic storage devices coupled thereto, the data storage devices storing a relational database;

(b) means, performed by the computer, for accepting the SQL query into the memory of the computer, the query being performed by the computer to retrieve data from a relational database stored in the electronic storage devices;

(c) means, performed by the computer, for examining the query in the memory of the computer to determine whether the query includes a star join operation on a base table and a plurality of dimension tables; and (d) means, performed by the computer, for performing a hash star join operation in the memory of the computer when the query includes the star join operation on the base table and the plurality of dimension tables, further comprising:

(1) means for hash partitioning the base table into a plurality of distinct and separate sub-portions thereof;

(2) means for selecting and projecting rows from all of the dimension tables to separate temporary tables;

(3) means for splitting the query into a plurality of sub-queries, wherein each of the sub-queries comprises a hash star join operation on the separate temporary tables and one or more of the distinct sub-portions of the base table;

(4) means for performing each of the sub-queries independently of one another to create intermediate result tables; and (5) means for merging the intermediate result tables from each of the performed sub-queries to create an output table.

6. The apparatus of claim 5 above, wherein the computer system comprises a plurality of processors, and the means for performing the sub-queries independently of one another further comprises means for performing the sub-queries independently on different ones of the processors.

7. The apparatus of claim 6 above, further comprising means for storing each of the distinct sub-portions of the base table by a different one of the processors.

8. The apparatus of claim 6 above, further comprising the step of duplicating the separate temporary tables across all of the processors.

9. A program storage device, readable by a computer, tangibly embodying a program of instructions executable by the computer to perform method steps for executing a query in a computer having a memory, the query being performed by the computer to retrieve data from a relational database stored in one or more electronic storage devices coupled to the computer, the method comprising the steps of:

(a) examining the query in the memory of the computer to determine whether the query includes a star join operation on a base table and a plurality of dimension tables; and (b) performing, in the memory of the computer, a hash star join operation when the query includes the star join operation on the base table and the plurality of dimension tables, further comprising the steps of:

(1) hash partitioning the base table into a plurality of distinct and separate sub-portions thereof;

(2) selecting and projecting rows from all of the dimension tables to separate temporary tables;

(3) splitting the query into a plurality of sub-queries, wherein each of the sub-queries comprises a hash star join operation on the separate temporary tables and one or more of the distinct sub-portions of the base table;

(4) performing each of the sub-queries independently of one another to create intermediate result tables; and (5) merging the intermediate result tables from each of the performed sub-queries to create an output table.

10. The method of claim 9 above, wherein the computer system comprises a plurality of processors, and the step of performing the sub-queries independently of one another further comprises the step of performing the sub-queries independently on different ones of the processors.

11. The method of claim 10 above, further comprising the step of storing each of the distinct sub-portions of the base table by a different one of the processors.

12. The method of claim 10 above, further comprising the step of duplicating the separate temporary tables 13. The method of claim 1 above, further comprising the step of performing the hash star join operation in place of a sequence of binary join operations when the query includes a star join operation on a base table and a plurality of dimension tables.

14. The method of claim 1 above, wherein each of the sub-queries comprises a join operation on the rows of the temporary tables derived from the dimension tables and the hash partitioned base table.

15. The method of claim 1 above, wherein the join operation is a multi-table join step, which reads a row from each of the temporary tables, and hashes all the combinations of the dimension tables' connection clauses, so that a hash probe can be made to possibly find a matching row in the base table.

16. The apparatus of claim 5 above, further comprising the step of performing the hash star join operation in place of a sequence of binary join operations when the query includes a star join operation on a base table and a plurality of dimension tables.

17. The apparatus of claim 5 above, wherein each of the sub-queries comprises a join operation on the rows of the temporary tables derived from the dimension tables and the hash partitioned base table.

18. The apparatus of claim 5 above, wherein the join operation is a multi-table join step, which reads a row from each of the temporary tables, and hashes all the combinations of the dimension tables' connection clauses, so that a hash probe can be made to possibly find a matching row in the base table.

19. The method of claim 10 above, further comprising the step of performing the hash star join operation in place of a sequence of binary join operations when the query includes a star join operation on a base table and a plurality of dimension tables.

20. The method of claim 10 above, wherein each of the sub-queries comprises a join operation on the rows of the temporary tables derived from the dimension tables and the hash partitioned base table.

21. The method of claim 10 above, wherein the join operation is a multi-table join step, which reads a row from each of the temporary tables, and hashes all the combinations of the dimension tables' connection clauses, so that a hash probe can be made to possibly find a matching row in the base table.

* * * * *

UNITED STATES PATENT AND TRADEMARK OFFICE
CERTIFICATE OF CORRECTION

PATENT NO. : 5,864,842
DATED : Jan. 26, 1999
INVENTOR(S) : Donald Raymond Pederson, et al.

It is certified that error appears in the above-indentified patent and that said Letters Patent is hereby corrected as shown below:

Column 12, line 12, after "tables" add -- across all of the processors.--

Signed and Sealed this

Twenty-fourth Day of August, 1999

Attest:

Q. TODD DICKINSON

*Attesting Officer*   *Acting Commissioner of Patents and Trademarks*